June 9, 1925. 1,540,747
T. A. BANNING, JR
METER AND THE LIKE
Filed Dec. 29, 1923 3 Sheets-Sheet 2

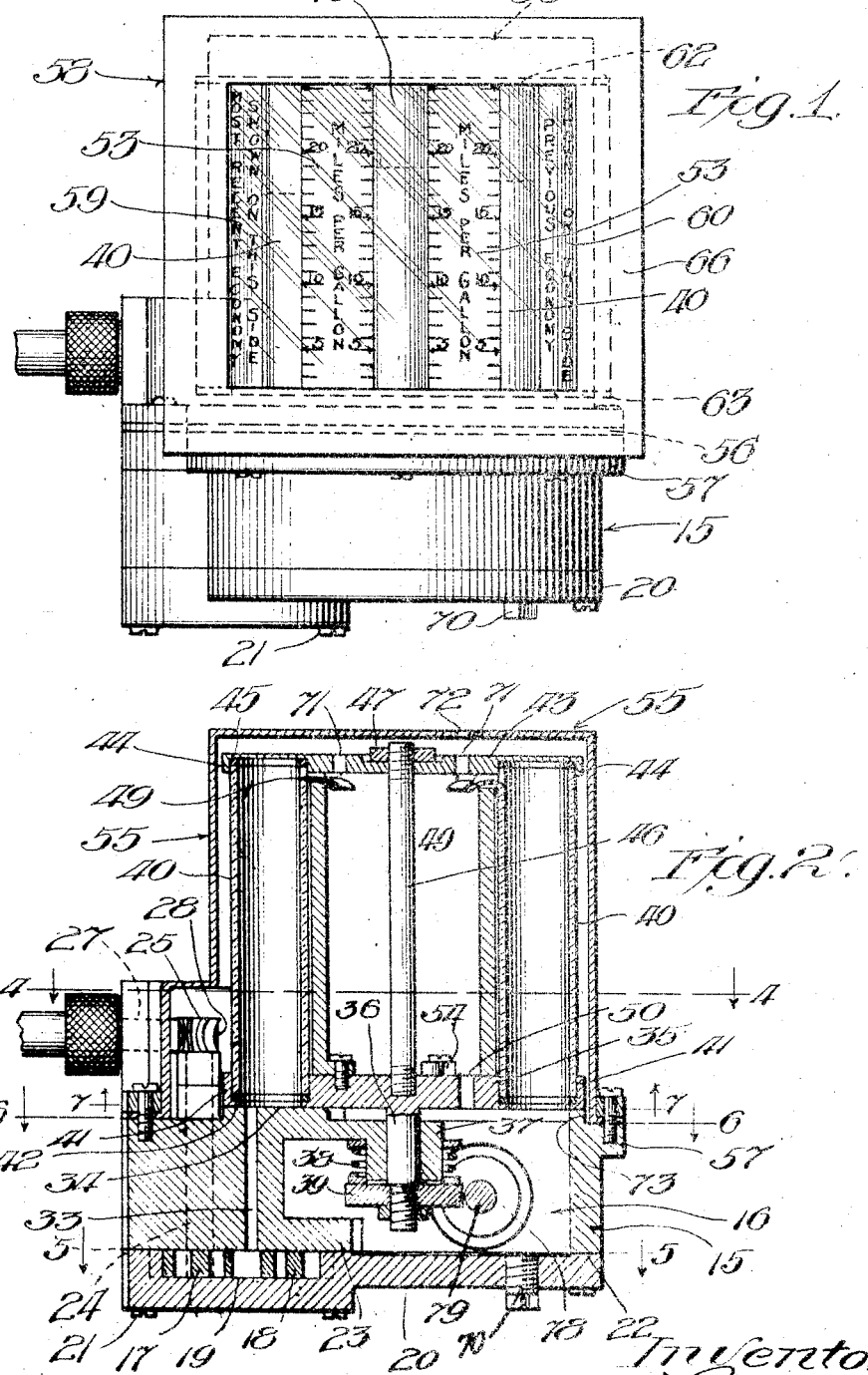

Inventor:
Thomas A. Banning Jr
by Banning & Banning
Attys

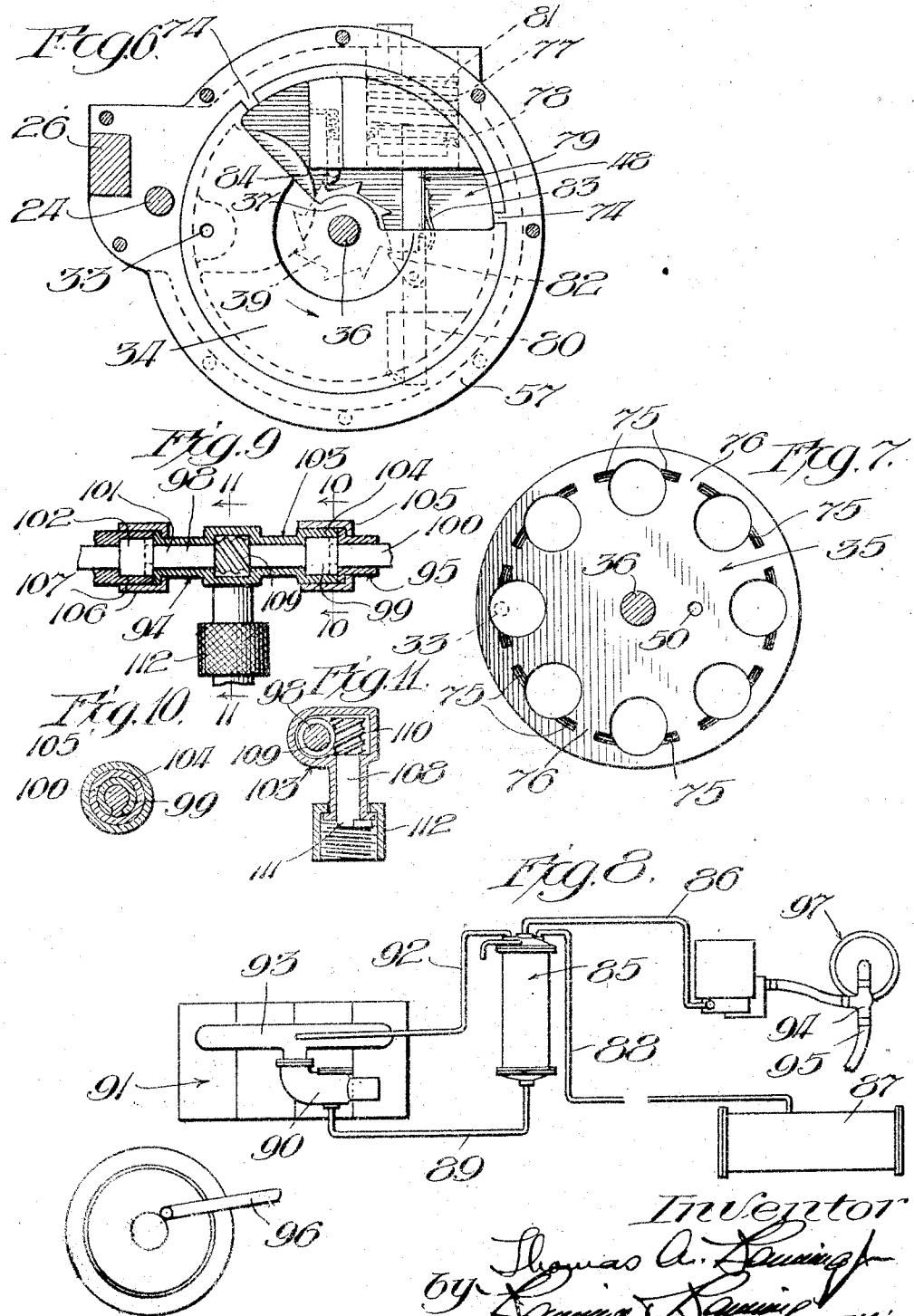

Patented June 9, 1925.

1,540,747

UNITED STATES PATENT OFFICE.

THOMAS A. BANNING, JR., OF WILMETTE, ILLINOIS.

METER AND THE LIKE.

Application filed December 29, 1923. Serial No. 683,323.

*To all whom it may concern:*

Be it known that I, THOMAS A. BANNING, Jr., a citizen of the United States, residing at Wilmette, in the county of Cook and State of Illinois, have invented certain new and useful Improvements in Meters and the like, of which the following is a specification.

The present invention has to do with certain improvements in meters. The invention has reference particularly to improvements in meters for showing a differential ratio between two variable elements such as the ratio of miles traveled divided by gallons of fuel consumed or air consumed divided by gallons of fuel consumed, or any other similar ratio which it is desired to ascertain.

In connection with the foregoing, I will state that the instrument herein disclosed has been devised particularly with a view to conveniently indicating the mileage delivered in the operation of motor vehicles such as automobiles, trucks, railway motor cars, etc., as compared to the gasoline or other fuel consumption. Ordinarily this ratio is conveniently designated as miles per gallon since these terms have come into familiar use; but it will be understood that as far as the principles of the instrument are concerned, other ratios may be indicated.

In this connection I will also state that the type of instrument herein disclosed is very readily adaptable for indicating other ratios which it is desirable to ascertain in connection with motor plants, such as the number of cubic feet of air consumed per gallon of gasoline, since this ratio is in some respects a measure of the completeness of the combustion and efficiency of the machine.

Still more particularly the type of instrument herein disclosed is one which is intended to indicate the ratio between miles or other variable factor and gallons or other selected unit, on the basis of performance extending over a sufficient length of time or a sufficient amount of fuel consumption so as to indicate a fair average condition. This is to be distinguished from the indication of a mere momentarily existing ratio such as would be established by a continuous correction of the instrument from instant to instant. In other words, the instrument herein disclosed is so arranged that it corrects itself after the consumption of a predetermined quantity of fuel so as to indicate the mileage or amount of other variable factor established during the consumption of this unit, preferably reduced to the basis of miles per gallon or other convenient ratio.

A further object of the invention is to provide an instrument which may be so constructed as to give a simultaneous indication of motor performance for not only the most recent unit quantity of fuel, but also for one or more unit quantities of fuel immediately preceding the one last consumed. For example, the instrument may give an indication of the miles per gallon derived from the last unit quantity and a simultaneous indication of the miles per gallon given by each of two immediately preceding unit quantities. In this way the driver will have presented to his attention a convenient comparison of present performance as compared to that which existed a while back. He can thus see whether the operating conditions of his motor have materially changed during the recent operation.

A further object of the invention is to provide an instrument which is so arranged that in case of an abnormal amount of road travel or other variable being derived from the consumption of the unit quantity of fuel, proper provision will be made for accommodating the operation of the instrument under such abnormal conditions without damage to its parts.

A further object of the invention is to provide an instrument of very simple and rugged construction and one which can be very cheaply manufactured with relatively few machine operations and largely by the use of die-castings.

More particularly it is an object of the invention to provide an instrument in which use is made of a liquid, generally colored with some distinctive color, so that the same will appear sharply against a suitable background such as a background of white enamel, or celluloid, or bakelite, or redmanol, or other suitable material. Usually this colored liquid will be exposed through glass tubes which are so arranged that the elevation or position of the liquid within the tubes is a direct indication of the miles per gallon or other variable, its position being easily compared to the background.

Other objects and uses of the invention will appear from a detailed description of the same which consists in the features of construction and combinations of parts hereinafter described and claimed.

In the drawings:

Figure 1 shows a front elevation of one form of instrument embodying the features of the present invention;

Fig. 2 is a vertical transverse section through the instrument, being taken on line 2—2 of Fig. 4, looking in the direction of the arrows;

Fig. 6 is a horizontal section at the position of the stationary table, being taken on the line 6—6 of Fig. 2, looking in the direction of the arrows;

Fig. 7 is a bottom plan view of the turn table, being taken on the line 7—7 of Fig. 2, looking in the direction of the arrows;

Fig. 8 shows diagrammatically one method of application of an instrument embodying the features of the present invention to a motor vehicle so as to indicate miles per gallon, the road travel connection being made to the usual drive shaft for the speedometer, and the periodic actuation of the turntable being effected by a suction connection to the usual vacuum feed tank;

Fig. 9 shows partly in section a longitudinal view of a simple T-connector for deriving a connection to the road travel as measured by the speedometer drive shaft;

Fig. 10 is a section taken on the line 10—10 of Fig. 9, looking in the direction of the arrows; and Fig. 11 is a section taken on the line 11—11 of Fig. 9, looking in the direction of the arrows.

Figure 3:
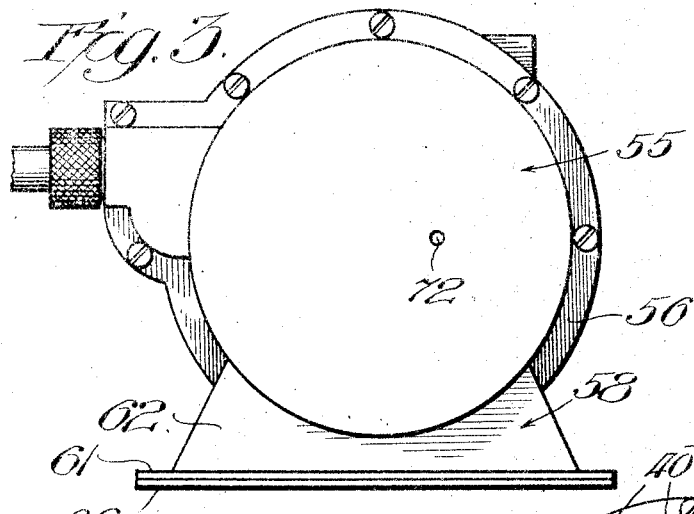
Fig. 3 is a plan view of the instrument.
Figure 4:
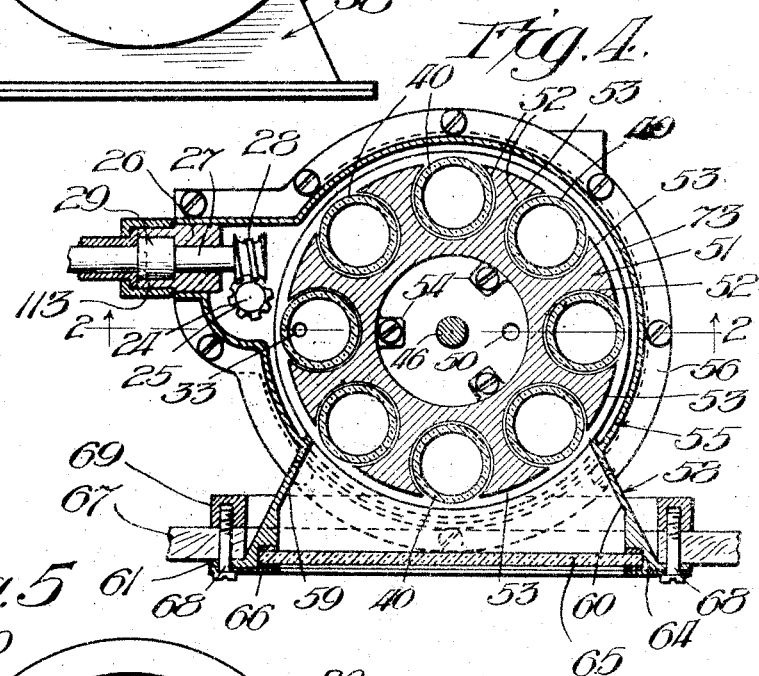
Fig. 4 is a horizontal transverse section taken on the line 4—4 of Fig. 2, looking in the direction of the arrows.

The instrument illustrated in the drawings includes a base member 15 having a chamber 16 of proper size to accommodate the desired quantity of liquid which is used for indicating the performance being measured. Usually this liquid will take the form of a light oil such as a light motor oil, tinted or dyed with red or blue dye. The nature and color of the liquid used is, of course, largely optional, and, in some cases, such liquids as mercury or water from other liquids may be substituted. Ordinarily it is desirable to use a liquid which may retain its freedom of flow and not become viscous even at the minimum temperature ordinarily encountered. In some cases colored alcohol will be found very desirable.

A small pump is provided for drawing the liquid from the receptacle 16 and delivering it to the indicator. For this purpose I have indicated a gear pump comprising the gears 17 and 18 which are properly meshed together and located within a depressed recess 19 in the base plate 20 of the instrument. This base plate is conveniently removable from the base member 15, being held in place by tap screws 21. Ordinarily the base plate will be slightly raised around its periphery and other sealing portions as shown at 22 and 23 in Fig. 5 in particular, so that ground surfaces can be established, if desired, in order to ensure an accurate and substantially leak-proof operation of the pump.

Figure 5:
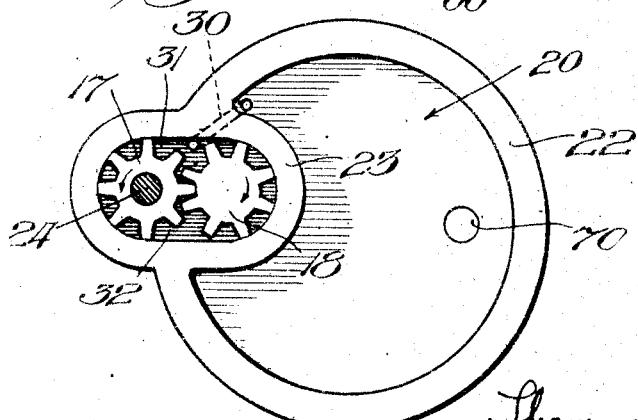
Fig. 5 is a plan view of the base plate together with the pumping mechanism, being taken on the line 5—5 of Fig. 2, looking in the direction of the arrows.

The pump is adapted to rotate in the direction of the arrows in Fig. 5. For this purpose the gear 17 is provided with a vertical shaft 24 which reaches up through the base of the instrument and carries a spiral gear 25 at its upper end. A stand 26 also reaches up from the base of the instrument and carries a short stub shaft 27 having a companion spiral gear 28 on its inner end. The stub shaft 27 is shown as provided with a coupling 29 by means of which it may be driven by the road travel of the vehicle or by the consumption of whatever variable is being measured.

The pump draws liquid through a connection 30 reaching from the chamber 16 to the intake side 31 of the pump. The liquid is discharged from the discharge side 32 of the pump upwardly through a passage 33 in the base member 15. As the vehicle travels along the road, the amount of liquid discharged upwardly through this passage 33 will be exactly proportionate to the amount of road travel.

The upper portion of the base member 15 takes the form of a stationary table 34, a portion of which is cut away for reasons to be presently explained. Immediately above the stationary table 34 is a turntable 35. This turntable has a downwardly depending stem 36 which is centrally journaled in a lug 37 carried by the base member 15. In some cases it may be desirable to place a spring 38 in suitable position for drawing the turntable firmly against the stationary table so that the two will be kept in sealing contact notwithstanding jarring due to road travel.

For this purpose, I have shown the spring 38 as surrounding the lug 37 as working against a member 39 on the lower end of the turntable stem 36. This member happens to take the form of a ratchet wheel presently to be explained. The turntable carries one or more indicating tubes 40 which are preferably of glass or other transparent material either in whole or in part. These tubes are preferably sealed onto the turntable 35 in a leak-proof manner. In the particular construction illustrated, eight of these tubes are provided equally spaced around the turntable, and the turntable itself is provided with an equal number of sockets 41 to receive the lower ends of the tubes. A gasket or washer 42 is preferably placed at the lower end of each tube, so that by pressing the tube thereagainst a perfectly leak-proof connection is established.

In the construction illustrated all of the tubes are drawn firmly into the sockets by a cap plate 43 which extends over all of the tubes and is provided with sockets 44 to receive the upper ends. A gasket 45 is placed at the upper end of each tube in order to seal the same if desired, and also to establish a slight cushion at this point. A centrally vertical rod 46 has its lower end connected into the turntable, and its upper end is provided with a nut 47 by means of which the cap 43 is drawn home as explained.

As the turntable is rotated the tubes are brought successively into position above the liquid discharge passage 33. At completion of each unit quantity of fuel, the turntable is notched over one notch so as to bring a new tube into position over the passage 33. The turntable then rests in this position during the consumption of such unit quantity of fuel, during all of which time the liquid is rising within the tube proportionate to the road of travel. As soon as the unit quantity of fuel is completed, the turntable is again notched over one notch, and this particular tube is moved around to a point of vision and a new tube is brought into place above the passage 33.

The direction of rotation of the turntable is indicated by the arrow in Fig. 6, and it will be noted that for a considerable distance the tube just used stands over a portion of the fixed table which serves to seal its lower end. In this way the liquid is retained within the tube so that its elevation remains unchanged during its period of visibility.

The back portion of the fixed table 34 is cut away or open as shown at 48, so that as the tubes are progressively carried over this cutaway portion by rotation of the turntable, they deliver their liquid back into the base chamber 16 and are themselves entirely cleared. In case the road travel should be excessive or abnormally large during the consumption of a unit quantity of fuel, the tube standing above the passage 33 would become overloaded and might be subjected to such a pressure as would damage the parts, or if this did not occur the pressure might become sufficient to lift the turntable slightly against the force of the spring 38 and thus allow the different tubes to discharge a portion of their liquid and give an incorrect reading.

I have, therefore, made provision for allowing each tube to overflow at its upper end in case the road travel should be excessive, as, for example, in coasting down a long grade. For this purpose the upper end of each tube is provided with a small spout or nipple 49 which will allow the liquid to spill back toward the interior of the instrument and down onto the turntable itself and be discharged through an opening 50 into the base chamber 16. It will be understood, however, that the parts are intended to be so proportioned that the tube will retain all of the liquid for the maximum probable road travel normally delivered on a unit quantity of fuel, so that in the normal operation of the instrument, the liquid never reaches the spillway.

As previously mentioned, the height of the liquid in each tube is a measure of the road travel or other variable. Any suitable scale or indicator may be provided with which this height may be compared; but the arrangement illustrated is very well adapted to give an accurate reading and also provides an attractive and satisfactory instrument from many standpoints. This arrangement includes a cellular member 51 of generally circular form and having the cells 52 to accommodate the different glass tubes. These cells are incomplete in the sense that they are not completely enclosed so that at least a portion of the width of each tube may be exposed to view. In some cases, the tubes themselves might be discontinuous and simply serve to cover over the exposed portions of the cells, so that the liquid would be directly retained within the cells instead of being directly retained by the tubes which are located in the cells. This cellular member 51 thus provides a series of vertical partitions 53 which occupy positions between the exposed portions of the consecutive tubes. The cellular structure itself, of course, rotates with the turntable and is preferably secured to the same in a firm manner by a series of lugs 54, together with tap screws which pass through them into the turntable. This arrangement is desirable since if any liquid should be spilled over the spillways 49 and down onto the central portion of the turntable, it would be prevented from leaking outwardly between the tubes where it would present an unsightly appearance.

The desired markings of miles per gallon or other variable may be placed directly upon the faces 53 as is clearly shown in Fig. 1. These faces may either be directly marked, or they may be coated with white enamel, or with strips of celluloid suitably engraved, or treated in any other convenient manner. In most cases, however, it will be found very desirable to have these exposed surfaces provided with a white background together with black or very dark markings thereon so as to emphasize the distinctive appearance of the colored liquids within the tubes exposed between these surfaces.

By the use of this general type of arrangement, it will be noted that the scales and their markings always occupy a definite fixed position with respect to the tubes, and a position which is so close to the tubes that the elevation of the liquid within the latter can be very easily compared with these markings. Consequently a very accurate and satisfactory reading is presented and does not require any particular effort on the part of the driver to ascertain the reading.

I prefer to provide a suitable housing for the turntable together with the tubes, etc. I have, therefore, indicated a housing 55 which is of generally cylindrical form and has a flange 56 which seats down against a companion flange 57 on the base member 15. The housing 55 may be made of aluminum or die casting metal or stamped out of sheet metal, or made in any other convenient manner. This housing is shown as being provided with a forwardly reaching extension 58 which has the slanting side walls 59 and 60 together with a flat front flange 61. It also has the top and bottom portions 62 and 63 respectively. This extension 58, therefore, presents a substantially rectangular finder through which the operator sees exposed to his view only a portion of the turntable and related parts. This finder is preferably of such size and shape that it exposes to view only those tubes which momentarily carry indicating liquid, together with the intermediate turntable cellular sections 53 having the comparison readings thereon. This finder also preferably cuts off from view the bottom and top ends of the turntable, so that only the effective portions of the tubes are exposed to view.

As a matter of convenience the extension 58 may also be recessed as shown at 64 to receive a glass plate 65 which covers over and protects the instrument, and also a cover plate 66 which holds the window 65 in place and gives the exposed portion of the instrument a finished and attractive appearance. The instrument may be held in place with respect to the dash board 67 by means of a series of tap screws 68 which reach through the dash board and engage a block 69 on the back side thereof. As shown in Fig. 1, the slanting surface 59 and 60 may be conveniently provided with suitable markings to designate such facts as it may be desirable to call forcibly to the attention of the driver. For example, in the instrument illustrated in Fig. 1, the left-hand surface 59 is so marked as to show that the left-hand exposed tube indicates the most recent motor economy; and the right-hand surface 60 is so marked as to show that the right-hand tubes indicate previous motor economy. If desired, a plug 70 may be provided in the bottom plate 20 as a convenient means for draining the chamber 16. Furthermore, vents 71 may be formed in the plate 43 and a vent 72 in the housing 55 so as to allow for equalization of pressures if necessary.

It will be understood that the fixed table 34 and the bottom surface of the turntable are in close contact so as to establish a practically leak-tight joint between them. If, however, a slight amount of liquid should eventually seep through between these surfaces, the same will collect in the passage 73 around the lower portion of the housing, and will thence return through the notches 74 back into the central chamber 16. Any such liquid will not be exposed to view in the finder and will not cause any harm whatsoever.

It will be noted that each time the turntable is moved so as to carry the lower end of the tube away from the passage 33 and bring the lower end of another tube above said passage, there would be a slight interval of time during which the upper end of the passage 33 would be sealed. The duration of this interval would depend upon the rapidity with which the turntable was turned, as well as the distance to be traversed between the two tubes.

In order to reduce this interval of sealing as small as possible, I have provided the curved channels 75 on the lower face of the turntable and at the sides of the tube openings, but the channels 75 for one tube do not reach entirely over to those for the adjacent tubes, but leave short intermediate blank spaces 76 as clearly shown in Fig. 7. These blank spaces 76 are slightly greater in width than the size of the upper end of the delivery passage 33 so that there is no possibility of a momentary transfer of liquid from one tube to the next adjacent tube. Nevertheless, the interval of sealing of the passage 33 is made so small that to all practical purposes the delivery of liquid from it may be continuous.

The turntable may be turned in any convenient manner at the completion of the unit quantity of fuel, and for that matter any suitable mechanism may be provided for metering the fuel and to bringing about the rotation of the turntable at the proper time.

In the construction illustrated I have provided a horizontal cylindrical chamber 77 in the back portion of the base member 15 within which chamber is placed a suction plunger 78 having connected thereto a horizontal stem 79. Said stem reaches over into a socket 80 in the other side of the base member, so as to guide the back and forth movements of the stem. A spring 81 normally forces the plunger and stem into the position illustrated in Fig. 6.

It was previously explained that the member 89 is a ratchet wheel. The stem 79 carries a pawl 82 which is adapted to successively engage the teeth of this ratchet wheel, said pawl being spring retracted by the spring 83. A dog 84 is provided in the base member for preventing a back movement of the ratchet and turntable.

The cylinder 77 may be connected to the upper portion of the vacuum feed tank 85 by a suction connection 86, so that each time the float of the vacuum feed tank is reversed so as to establish a vacuum within the tank, this vacuum will be correspondingly established within the cylinder 77. The plunger 78 will thus be drawn inward against the spring 81 so as to notch over the turntable.

The usual fuel supply tank 87 is illustrated in Fig. 8 together with the fuel line 88 reaching therefrom into the upper portion of the vacuum feed tank 85. The fuel delivery line 89 reaches from the vacuum feed tank to the carburetor 90 of the motor 91. The suction connection 92 for the vacuum feed tank reaches thereto from the intake manifold 93. The operation of these parts is well understood in the art. As previously mentioned the pump is driven in proportion to the road travel of the vehicle. A convenient means for doing this consists in placing a T-connection 94 between the upper end 95 of the speedometer drive shaft 96 and the speedometer 97 itself. This T-connection is shown in detail in Figs. 9, 10, and 11. It includes a through shaft 98 having on one end a coupling 99 adapted to couple onto the upper end 100 of the drive shaft 96 and having at its upper end a coupling 101 which is adapted to couple onto the speedometer coupling 102. The through shaft 98 is carried by a small housing 103 having at one end a flange 104 which is adapted to receive a union coupling 105 of the speedometer drive shaft, and at its other end this housing 103 has a union coupling 106 which is adapted to engage the flange 107 of the speedometer.

Ordinarily the union coupling 105 of the flexible drive shaft 96 is coupled directly onto a flange 107 of the speedometer. In the present case the T-connector is introduced and its end portions are so related that they will couple up properly with the speedometer and with the drive shaft, respectively, the only effect being to displace the end of the speedometer drive shaft two or three inches from the position which it usually occupies next to the speedometer.

The engine connector also includes a short offset shaft 108 which is driven from the shaft 98 by means of spiral gears 109 and 110, respectively. This shaft 108 is provided with a coupling 111 of the same form as the coupling 101 and is also provided with a union coupling 112 of the same form as the union couplings 105 and 106. The union coupling 112 may be directly connected to the flange 113 of the miles per gallon indicator, or a short section of flexible shafting may be introduced between the parts, if desired. In any case, however, the effect will be to drive the pump from the same flexible shaft which operates the speedometer.

In connection with the foregoing, it will be observed that in the normal operation of the present instrument, it is not necessary for the pump to develop any appreciable amount of pressure, since its only function is to displace liquid proportionately to the road travel of the vehicle, and the only pressure encountered is a very slight amount of height up into the tubes 40. Consequently, any additional burden thus placed on the speedometer drive shaft is practically inappreciable.

It will be noted that instruments involving the features of the present invention may be used for many other purposes than showing miles per gallon of a motor driven vehicle. For example they may be used for showing the economy of stationary engines by showing a ration between revolutions and pounds of steam consumed. Consequently, where in the specification and claims to follow I use the expression "motor," it will be understood I contemplate any form of engine or prime mover as well as a motor vehicle or self-propelled machine; and also that where I use the expression "travel," I contemplate not only the lineal displacement of a vehicle, such as its movement along the road, but also the intended movement of a motor, such as its revolutions. In like manner, by the expression "distance traversed" I contemplate not only the actual distance of travel of a vehicle along the road, but also the movement of an engine measured in its revolutions or other "travel."

I claim:

1. In a device for displacing liquid substantially in proportion to the travel of a motor and a receptacle for liquid so displaced, means for delivering liquid from said displacing means to said receptacle for accumulation in the receptacle during the consumption of a unit of fuel by the motor, and means for indicating the ratio of liquid delivered to the receptacle as compared to fuel required to propel the motor, substantially as described.

2. In a device for displacing liquid substantially in proportion to the travel of a motor and a receptacle for liquid so displaced, means for delivering liquid from said displacing means to said receptacle for accumulation in the receptacle during the consumption of a unit of fuel by the motor, and means in conjunction with the receptacle for indicating the ratio of distance traversed by the motor as compared to fuel consumed by the motor, substantially as described.

3. In a device for displacing liquid substantially in proportion to the travel of a motor and a receptacle for liquid so displaced including a vertical tube, means for connecting the displacing means periodically to said tube with the completion of unit quantities of fuel by the motor for accumulation of liquid in the tube, and return connections from the upper portion of the tube to the receptacle permitting return of excess liquid from the tube to the receptacle, substantially as described.

4. In a device of the kind disclosed, a pair of receptacles for liquid, means in conjunction with one receptacle for indicating distance traversed per unit of fuel consumed by use of the liquid in said receptacle, displacing means intermediate between said receptacles operable to transfer liquid from one receptacle to the indicating receptacle proportionately to the travel of the motor, and means for making ineffective such transfer of liquid after the consumption of a unit quantity of fuel by the motor, substantially as described.

5. In a device of the kind disclosed, a receptacle for liquid, means in conjunction therewith for indicating distance traversed per unit of fuel consumed by comparison with the liquid accumulated in said receptacle, displacing means in conjunction with said receptacle operable to transfer liquid thereto proportionately to the travel of the motor, and means for making ineffective such transfer of liquid to said receptacle after the consumption of a unit quantity of fuel by the motor, substantially as described.

6. In a device for displacing liquid substantially in proportion to the travel of a motor and a receptacle for said liquid, means in conjunction therewith for indicating distance traversed per unit of fuel consumed by use of the liquid displaced with respect to said receptacle, means operable proportionately to the travel of the motor, for displacing liquid, with respect to said receptacle, and means for making ineffective such displacement after the consumption of a unit quantity of fuel by the motor, substantially as described.

7. In a device of the kind disclosed, the combination of a base member having therein a chamber for liquid and providing on its upper face a horizontal stationary table, the rear portion of said table being cut away to directly expose the chamber, a pump in the base member and at a lower elevation than the chamber aforesaid, an intake connection from the chamber to the pump, a delivery connection from the pump to the surface of the table aforesaid, a vertical drive shaft to the pump, a turntable resting upon the stationary table aforesaid and having a cellular structure on its upper portion, a vertical pivot stem reaching downwardly from the turntable into the base member, the cellular structure having a plurality of vertical cells around its periphery, the outer wall of each cell being cut away on a vertical line of vision, a transparent tube within each cell, means for sealing the lower ends of all of the tubes in liquid tight fashion with respect to the turntable, there being an opening through the turntable communicating with the lower end of each tube, all of said openings being adapted to successively register with the delivery opening from the pump as the turntable is rotated, suitable markings of distance traversed per unit of fuel consumed, on the exposed face of the turntable intermediate between the cutaway portions aforesaid, means for periodically turning the turntable stem to advance its peripheral portion the distance between vertical cells, a housing enclosing the turntable and cellular structure, and resting upon and supported by the peripheral portion of the base member, and a suitable sight opening in said housing with which the turntable cell openings successively register, substantially as described.

8. In a device of the kind disclosed, the combination of a base member having therein a chamber for liquid and providing on its upper face a horizontal stationary table, the rear portion of said table being cut away to directly expose the chamber, a pump in the base member and at a lower elevation than the chamber aforesaid, an intake connection from the chamber to the pump, a delivery connection from the pump to the surface of the table aforesaid, a vertical drive shaft to the pump, a turntable resting upon the stationary table aforesaid and having a cellular structure on its upper portion, a vertical pivot stem reaching downwardly from the turntable into the base member, the cellular structure having a plurality of vertical cells around its periphery, the outer wall of each cell being cut away on a vertical line of vision, a transparent tube within each cell, means for sealing the lower ends of all of the tubes in liquid tight fashion with respect to the turntable, there being an opening through the turntable communicating with the lower end of each tube, all of said openings being adapted to successively register with the delivery opening from the pump as the turntable is rotated, suitable markings of distance traversed per unit of fuel consumed on the exposed faces of the turntable intermediate between the cutaway portions aforesaid, and means for periodically turning the turntable stem to advance its peripheral portion the distance between vertical cells, substantially as described.

9. In a device of the kind disclosed, the combination of a base member having therein a chamber for liquid and providing on its upper face a horizontal stationary table, the rear portion of said table being cut away to directly expose the chamber, a pump, an intake connection from the chamber to the pump, a delivery connection from the pump to the surface of the table aforesaid, a drive shaft to the pump, a turntable resting upon the stationary table aforesaid and having a cellular structure on its upper portion, the cellular structure having a plurality of vertical cells around its periphery, the outer wall of each cell being cut away on a vertical line of vision, a transparent tube within each cell, means for sealing the lower ends of all of the tubes in liquid tight fashion with respect to the turntable, there being an opening through the turntable communicating with the lower end of each tube, all of said openings being adapted to successively register with the delivery opening from the pump as the turntable is rotated, suitable markings of distance traversed per unit of fuel consumed on the exposed faces of the turntable intermediate between the cutaway portions aforesaid, and means for periodically turning the turntable to advance its peripheral portion the distance between vertical cells, substantially as described.

10. In a device of the kind disclosed, the combination of a base member having therein a chamber for liquid and providing on its upper face a horizontal stationary table, said table having an opening in its rear portion leading back to the chamber, a pump, means for operating the same proportionately with respect to motor travel, an intake connection from the chamber to the pump, a delivery connection from the pump to the surface of the table aforesaid, a drive shaft to the pump, a turntable resting upon the stationary table aforesaid, a plurality of vertical transparent tubes carried by the turntable around its periphery, the lower ends of all of said tubes being adapted to successively register with the delivery opening from the pump as the turntable is rotated, suitable markings of distance traversed per unit of fuel consumed arranged in vertical fashion for direct comparison with the liquid in the various tubes, and means for periodically turning the turntable to advance its peripheral portion the distance between tubes, substantially as described.

11. In a device of the kind disclosed, the combination of a base member having therein a chamber for liquid and providing on its upper face a horizontal stationary table, said table having an opening in its rear portion leading back to the chamber, a pump, means for operating the same proportionately with respect to motor travel, an intake connection from the chamber to the pump, a delivery connection from the pump to the surface of the table aforesaid, a drive shaft to the pump, a turntable resting upon the stationary table aforesaid, a plurality of vertical transparent tubes carried by the turntable around its periphery, the lower ends of all of said tubes being adapted to successively register with the delivery opening from the pump as the turntable is rotated, suitable markings of distance traversed per unit of fuel consumed arranged in vertical fashion for direct comparison with the liquid in the various tubes, and means for turning the turntable to advance its peripheral portion, substantially as described.

12. In a device of the kind disclosed, the combination of a turntable, a plurality of vertical transparent tubes arranged around the axis thereof, a chamber for liquid, a pump, an intake connection from the chamber to the pump, a delivery connection from the pump to a position adjacent to the path of travel of the lower ends of the tubes, means for periodically advancing the turntable to move the lower ends of the tubes with respect to the delivery connection, means for sealing the lower ends of the tubes after they move away from the delivery connection, and suitable markings of distance traversed per unit of fuel consumed arranged in vertical fashion for direct comparison with the liquid in the various tubes, substantially as described.

13. In a device for pumping liquid substantially in proportion to movement of one element, the combination of a turntable, a plurality of vertical transparent tubes around the axis thereof, a chamber for liquid, a pump, means for operating the same proportionately with respect to said movement, an intake connection from the chamber to the pump, a delivery connection from the pump to a position adjacent to the turntable, means for moving the turntable and delivery connection relatively with respect to each other to thereby establish communication between these parts in succession, and means for sealing the lower ends of the tubes after such connection is broken, substantially as described.

14. In a device of the kind disclosed, the combination of a chamber for liquid, a pump, an intake connection from the chamber to the pump, a plurality of vertical transparent tubes, markings of distance traversed per unit of fuel consumed in immediate proximity to the tubes, means permitting establishment of connection from the discharge side of the pump to the different tubes in succession, means for periodically advancing such connection from tube to tube, means for retaining the liquid within the tubes after such advancement, and means for subsequently permitting the return of liquid from the tubes to the chamber, substantially as described.

15. In a device of the kind disclosed, the combination of a series of receptacles for liquid, a central journal mounting for them and about which they may rotate intermittently, displacing means for displacing liquid at a point adjacent to the path of travel of said receptacles, and means for intermittently moving all of the receptacles with the completion of unit quantities of fuel to thereby bring the receptacles successively to the point of delivery of liquid so displaced, substantially as described.

16. In a device for pumping liquid substantially in proportion to movement of one element, the combination of a plurality of vertical tubes, a source for liquid supply, a pump, means for operating said pump proportionately with respect to movement of said element, an intake connection from the source of liquid supply to the pump, means for delivering liquid from the pump to the individual tubes in succession, means for retaining liquid within each tube during the interval when the succeeding tube is receiving liquid, and means for subsequently permitting discharge of liquid from each tube, substantially as described.

17. In a device of the kind disclosed, the combination of a plurality of vertical tubes, means for delivering liquid proportionately to the travel of the motor, means permitting the tubes to come successively into position to receive the liquid delivered thereby, and means for advancing the tubes periodically with the consumption of unit quantities of fuel by the motor, substantially as described.

18. In a device of the kind disclosed, the combination of vertical tubes, means for delivering liquid proportionately to the travel of the motor, and means for connecting the delivery means periodically to the different tubes in succession with the completion of unit quantities of fuel by the motor, substantially as described.

19. In a device for displacing liquid substantially in proportion to the travel of a motor, a vertical tube, and means for connecting the displacing means therewith only during the consumption of a unit quantity of fuel by the motor, substantially as described.

20. In a device of the kind disclosed, a plurality of indicators, markings of distance traversed per unit of fuel consumed in proximity thereto, and means for connecting the pumping means to each of said indicators in succession and only during the consumption of a unit quantity of fuel by the motor, substantially as described.

21. In a device of the kind disclosed, the combination of a series of receptacles for liquid, means for moving said receptacles intermittently, pumping means for delivering liquid to a point adjacent to the path of travel of said receptacles, and valve means in conjunction with said receptacles and pumping means effective to place the receptacles successively first in communication with the pumping means, then to seal the receptacles, then to allow discharge of liquid from the receptacles, substantially as described.

22. In a device of the kind disclosed, the combination of a turntable, a plurality of vertical transparent tubes arranged around the axis thereof, means for pumping liquid proportionately to the travel of the motor, means for delivering liquid from the pumping means to the different tubes in succession and only during the consumption of unit quantities of fuel by the motor, means for retaining the liquid within the tubes into which it is pumped, and means for defining a sight opening permitting vision of a plurality of said tubes with their contained liquid simultaneously, including the tube into which liquid has been last delivered, to thereby permit of comparison of a plurality of consecutive readings, substantially as described.

23. In a device of the kind disclosed, the combination of a turntable, a plurality of vertical transparent tubes arranged around the axis thereof, means for pumping liquid proportionately to the travel of the motor, means for delivering liquid from the pumping means to the different tubes in succession and only during the consumption of unit quantities of fuel by the motor, and means for defining a sight opening permitting vision of the tube into which liquid has been last delivered but excluding vision of the tube into which liquid is being momentarily delivered, substantially as described.

24. In a device of the kind disclosed, the combination of a plurality of vertical transparent tubes, means for pumping liquid proportionately to the travel of the motor, means for delivering the liquid so pumped to a given point, means for moving the tubes in succession past said point to thereby successively receive liquid delivered at said point and only during the consumption of unit quantities of fuel by the motor, and means for thereafter permitting vision of the tubes into which liquid has been pumped while excluding vision of the tube into which liquid is being momentarily delivered, substantially as described.

25. In a device of the kind disclosed, the combination of means for defining a sight opening, a plurality of vertical transparent tubes, means for moving the same in succession past said sight opening, means for pumping liquid proportionately to the travel of the motor, and means for delivering liquid to the tubes in succession and prior to their presentation at the sight opening aforesaid, substantially as described.

26. In a device of the kind disclosed, the combination of a sight opening, a circular cellular structure behind the same, vertical transparent portions in the faces of the cells thereof, means for pumping liquid proportionately to the travel of the motor, means for delivering liquid so pumped to the different cells in succession, and means for advancing the turntable periodically to carry the transparent portions of the cells into line with the sight opening aforesaid, substantially as described.

27. In a device of the kind disclosed, the combination of a chamber for liquid, means for metering liquid therefrom proportionately to the travel of the motor, a plurality of receptacles for liquid, means for connecting them successively to the metering means, and means for subsequently permitting return of liquid from them to the chamber aforesaid, substantially as described.

28. In a device of the kind disclosed, the combination of a chamber for liquid, means for metering liquid therefrom proportionately to the travel of the motor, a plurality of receptacles for liquid so metered, means for causing delivery of liquid from the metering means to the receptacles in succession, and means permitting overflow of liquid from each receptacle back to the chamber during the interval it is connected to the metering means to thereby compensate for overmetering into any receptacle due to excessive motor travel during the interval of connection to the pumping means, substantially as described.

29. The combination with the speedometer drive shaft and the vacuum fuel feed tank of a motor driven vehicle, of an instrument for metering liquid in proportion to the road travel of the vehicle, said instrument including a receptacle for liquid, means for metering liquid, a connection from the speedometer drive shaft to said metering means, means for delivering liquid from the metering means to the receptacle, means for indicating distance traversed per unit of fuel consumed by use of liquid accumulated in said receptacle by said metering means, and means for making ineffective the delivery means upon a dumping of the vacuum feed tank, substantially as described.

30. In a device of the kind disclosed, the combination of a plurality of indicating devices each operable to show ratio of one variable compared to another variable, means for intermittently moving said devices past a common point, and for simultaneous presentation of a plurality of said devices to vision, and means for successively causing said devices to indicate the successive ratios of the first variable compared to the second variable for successive unit quantities of the second variable, substantially as described.

31. In a device of the kind disclosed, the combination of a plurality of indicating devices each operable to show ratio of one variable compared to another variable, means for simultaneous presentation of a plurality of said devices to vision, and means for successively causing said devices to indicate the successive ratios of the first variable compared to the second variable for successive unit quantities of the second variable, substantially as described.

32. In a device of the kind disclosed, the combination of a plurality of indicating devices each operable to show ratio of one variable compared to another variable, and means for successively causing said devices to indicate correctly the successive ratios of the first variable compared to the second variable for successive unit quantities of the second variable, substantially as described.

33. In a device of the kind disclosed, the combination of an indicating device operable to show ratio of one variable compared to another variable, by use of liquid, means for metering said liquid substantially in proportion to one variable, and suitable valve connections between said metering means and said indicating means operable to cause the indicating means to indicate substantially in proportion to total volume of liquid metered during the consumption of a unit amount of the other variable, substantially as described.

34. In a device of the kind disclosed, the combination of an indicating device operable to show ratio of one variable compared to another variable, metering means for metering liquid substantially in proportion to one variable, and suitable connections between said metering means and said indicating means operable to cause the indicating means to indicate substantially in proportion to quantity of liquid metered during the consumption of a unit amount of the other variable, substantially as described.

THOMAS A. BANNIN, Jr.